US008185346B2

(12) United States Patent
Sjöstrand et al.

(10) Patent No.: US 8,185,346 B2
(45) Date of Patent: May 22, 2012

(54) DYNAMIC MAINTENANCE PLAN FOR AN INDUSTRIAL ROBOT

(75) Inventors: Niclas Sjöstrand, Västerås (SE); Dominique Blanc, Västerås (SE); Anders Lindin, Västerås (SE)

(73) Assignee: ABB Research Ltd., Zürich (CH)

( * ) Notice: Subject to any disclaimer, the term of this patent is extended or adjusted under 35 U.S.C. 154(b) by 911 days.

(21) Appl. No.: 12/073,225

(22) Filed: Mar. 3, 2008

(65) Prior Publication Data
US 2008/0228314 A1    Sep. 18, 2008

(30) Foreign Application Priority Data
Mar. 2, 2007  (EP) ..................................... 07103445

(51) Int. Cl.
*G01G 19/04* (2006.01)
*G06F 19/00* (2011.01)
(52) U.S. Cl. ......... 702/175; 702/179; 702/180; 702/189
(58) Field of Classification Search .......... 702/175–189, 702/113, 118–123
See application file for complete search history.

(56) References Cited

U.S. PATENT DOCUMENTS

| | | | |
|---|---|---|---|
| 6,615,103 B2 | 9/2003 | Fujishima et al. | |
| 2002/0013639 A1* | 1/2002 | Fujishima et al. | 700/175 |
| 2002/0049563 A1 | 4/2002 | Vetter et al. | |
| 2003/0158803 A1 | 8/2003 | Darken et al. | |
| 2004/0039560 A1 | 2/2004 | Hofman | |
| 2004/0044499 A1* | 3/2004 | House et al. | 702/181 |
| 2006/0282362 A1* | 12/2006 | Nasr et al. | 705/35 |

FOREIGN PATENT DOCUMENTS

| | | | |
|---|---|---|---|
| EP | 1162524 | * | 12/2001 |
| EP | 1162524 | A | 12/2001 |
| EP | 1202142 | A | 5/2002 |
| EP | 1205830 | A | 5/2002 |
| WO | WO-2005/109133 | A | 11/2005 |

OTHER PUBLICATIONS

Jardin et al., A review on machine diagnostics and prognostics implementing condition-based maintenance; Mechanical Systems and Signal Processing; vol. 20, No. 7, Oct. 2006, pp. 1483-1510.*
Xiang Li et al., An intelligent Predictive Engine for Milling Machine Prognostic Monitoring; IEEE; Aug. 2006; pp. 1075-1080.*
European Search Report—Jul. 31, 2007.
Jardin et al; A review on machinery diagnostics and prognostics implementing condition-based maintenance; Mechanical Systems and Signal Processing; vol. 20, No. 7, Oct. 2006, pp. 1483-1510.
Xiang Li, et al; An Intelligent Predictive Engine for Milling Machine Prognostic Monitoring; IEEE; Aug. 2006; pp. 1075-1080.

* cited by examiner

*Primary Examiner* — Phuong Huynh
(74) *Attorney, Agent, or Firm* — Venable LLP; Eric J. Franklin (57) ABSTRACT

A method for establishing a dynamic maintenance scheduling tool for a specific part of a machinery based on condensed prior knowledge of the part of the machinery in a population of machineries. The scheduling tool is in turn used in a method for establishing a dynamic maintenance schedule for a specific part of a specific machinery, wherein parameters related to the usage, including relevant parameters representing factors influencing the lifetime of the specific parts, are utilized as input data to the dynamic maintenance scheduling tool for the specific part of the machinery, whereupon a dynamic maintenance schedule for the specific part of the specific machinery is achieved as output data from the scheduling tool. The method is in particular dedicated to industrial robot systems.

23 Claims, 5 Drawing Sheets

DYNAMIC MAINTENANCE PLAN FOR AN INDUSTRIAL ROBOT

CROSS-REFERENCE TO RELATED APPLICATIONS

This application claims priority to European patent application 07103445.8 filed 2 Mar. 2007.

TECHNICAL FIELD

The present invention relates to methods for establishing maintenance schedules for a part of a machinery and for the machinery as a whole, in particular regarding an industrial robot.

BACKGROUND OF THE INVENTION

Nowadays preventive maintenance of a machinery is performed on occasions based on the size of a service agreement between a service department responsible for service of the machinery and a customer using the machinery. The amount of inspections per year can be settled in a service agreement. During inspections, one or several field service engineers are visiting the customer. The field service engineers perform preventive maintenance activities such as lubricating, cleaning, replacing packings, oil changing, etc. Normally, customers demand indications of a coming failure in order to give the field service engineer permission to replace parts. In many cases, service of the machinery, such as the service of an industrial robot, is performed in a reactive manner, which means that the robot is run until a failure occurs.

In this specification, the machinery referred to is exemplified by particularly pointing out maintenance of industrial robots.

Industrial robots are used in a variety of applications and environments and the usage of a robot in terms of load and motion parameters varies to a great extent from robot to robot. Therefore, usage of a static maintenance schedule for all robots in a population will cause many robots to have parts exchanged too soon, while other robots will have parts exchanged too late with undesired and costly production stops as a result.

industrial robots when sold to a customer are delivered together with product manuals. In the product manual there are recommendations regarding required maintenance activities and replacements. Times for the recommended replacements of exposed parts are not based on the usage of the industrial robot, whereby overloaded parts of industrial robots might break down before the recommended replacement times.

Machinery, such as industrial robots and comparative technical systems are developed to manage more and more functions and the complexity of such technical systems gets increasingly higher. More competition and higher demands on markets has forced companies to produce high qualitative products using more efficient production. In order to obtain the more efficient production, companies require increased reliability of the technical systems. Therefore maintenance of the machinery has drawn more attention and has become a very important competition weapon.

Industrial companies demand products with high availability and high reliability of operation. Other than investing in even more high quality technical systems, the users of a certain machinery, such as an industrial robot, set aside more and more resources to maintenance of the machinery. The industrial companies do accept production stops but they want to know in advance when the stops will occur.

An example of a way to avoid unnecessary stops of an industrial robot utilizing preventive maintenance is disclosed in U.S. Pat. No. 5,587,635. Said preventive maintenance relies on monitoring a specific component by means of direct sensing certain properties of robot, whereby the remaining lifetime could be estimated for the component or a drive system.

Another document describing prior art is EP 1 162 524 A. In this document the wear of one unit of, for example, a robot part is supervised and measured. The lifetime of the unit is directly associated with a level of wear. When said level is reached the unit is repaired or exchanged. There is no connection between factors having impact on the lifetime, but for speed and force, i.e. pure mechanical wear.

Still another document: Jardine et al, "a Review on machinery diagnostics and prognostics implementing condition-based maintenance", Mechanical systems and signal processing, London, GB, vol. 20, no. 7, October 2006, pages 1483-1510, XP005507568, ISSN: 0888-3270, is directed to condition based maintenance. The idea in this document is based on data being collected from a specific unit, such as a part of a machinery. Said data are processed in a computer. The condition of the unit is supervised and when the state of the unit in some way is deteriorated, a supervising device alerts that something is wrong with the unit. Nothing is stated in this document about the relevance of, e.g. the impact of external factors.

One more document referring to maintenance of a unit of a machinery is: Xiang Li, Junhong Zhou, Hao Zeng, "A intelligent predictive engine for milling machine prognostic monitoring", IEEE, International conference on industrial informatics, August 2006, XP002442651, whole document. In this document influencing factors are monitored, wherein signals representing the influencing factors representing measured values are monitored. Multiple regression is performed on said monitored signals, whereupon a lifetime of the monitored unit is estimated.

Document WO 2005/109133 A describes an invention, wherein a computer supervises and determines a point of time for maintenance of a monitored unit of a machinery.

The documents referred to above describe merely monitoring by use of signals collected from sensors measuring the state of the supervised unit in relation to mechanical impacts of the lifetime of the unit and they do not consider the impact of environmental factors that can have influence of the lifetime of a specific unit or of a complete machinery related to its specific use. These factors can be, e.g. temperature, humidity, range of movements in space, linear speed, rotational speed, accelerations. Further, neither do said documents consider data based on collected statistical data for lifetimes of a population of said specific unit of the machinery, neither times for preventive replacements performed for the specific part.

SUMMARY OF THE INVENTION

In the present invention, preventive maintenance is performed by use of knowledge of failures from an installed quantity of machinery, in particular industrial robots as specifically discussed herein. In said aspect, usage and environmental factors are also considered to automatically generate a dynamical customized maintenance schedule for a specific part of the machinery, such as a part of an industrial robot individual. Typically, the parts of an installed quantity of industrial robots are evaluated based on statistical and/or experience information. Each part of the machinery, such as a robot part, is also subjected to an assessment, wherein the usage and environmental conditions are evaluated. The result achieved from said assessment along with the knowledge of failures is used to automatically generate said dynamical customized maintenance schedule for the specific part of the robot. Based on a set of specific parts of the machinery a dynamic maintenance schedule for said machinery can then be created.

According to the invention the maintenance schedule for a specific part of the machinery shall be dynamic and based on the usage of the machinery, wherein said usage and environmental conditions affect said part causing different replacement times for equal parts of different but equal machineries, located and working under different conditions, to occur in a dynamic way. To be able to arrive at said maintenance schedule, influence factors have to be identified and evaluated and their impact on lifetimes have to be stated.

According to a first aspect of the invention a method for establishing a dynamic maintenance scheduling tool for a specific part of the machinery is disclosed. The term dynamic shall herein imply that the schedules are updated based on collection of new information in regard of failures and replacement times of parts further discussed below.

According to a second aspect of the present invention a method for establishing a dynamic maintenance schedule for a specific part of a specific machinery is disclosed, wherein parameters related to the usage, including relevant parameters representing factors influencing the lifetime of said specific parts, are utilized as input data to said dynamic maintenance scheduling tool for a specific part of the machinery, whereupon a dynamic maintenance schedule for said specific part of said specific machinery is achieved as output data from said tool.

According to a third aspect of the present invention a method for establishing a dynamic maintenance schedule for a specific machinery individual is provided. In said third aspect said dynamic maintenance schedules for all relevant parts of the machinery individual are compiled into a complete dynamic maintenance schedule for the machinery individual.

According to a fourth aspect of the present invention a method for establishing a dynamic maintenance schedule for a population of machinaries is provided. In said fourth aspect said dynamic maintenance schedules for all relevant parts of the population of machineries are compiled into a complete dynamic maintenance schedule for said machinery population.

Throughout this description an industrial robot is used to represent the machinery referred to in the aspects of the invention. Thus, the term machinery in any of the aspects above shall readily be replaced by the term industrial robot.

The method for arriving at the maintenance scheduling tool for said part of the machinery of the present invention is based on the following scheme:
 a selection of a critical part of the machinery,
 an identification of influence factors,
 an estimation of a replacement time for said selected part, whereupon
 a creation of a maintenance scheduling tool for said part of the machinery based on said identification of the influence factors and said estimation of the replacement time is performed.

Herein at least three ways for selecting the critical parts for arriving at the dynamic maintenance schedule are indicated. The three ways are:
 an analysis based on experience and knowledge,
 an analysis based on spare part sale
 a so called Weibull analysis.

The indicated ways could be used one by one or in any combination. The different ways will be further discussed below.

When the critical parts are identified and selected there are at least two ways for creating the scheduling tool. The scheduling tool can either be dynamic by using influence factors and usage or by using usage and costs.

When identification of influence factors and estimating replacement times for the selected critical parts shall be performed, at least two ways are applicable. A first way, discussed below, is to use multiple linear regression and cost optimized maintenance. A second way uses estimation of replacement times based on information from users with experience and knowledge in industrial robots resulting in field failure reports and/or results based on a machinery design analysis.

In this description, two different versions for processing a dynamic maintenance scheduling tool are disclosed, herein called, a full process and a simplified process. In the full process version, the scheme is further including a quality control. Said quality control can be based on two different reviews. A first review is based on lifetimes and replacement time according to the findings among men skilled in the art having experience and knowledge in the field. A second review is based on complete failure information, with respect to the specific part, validated and verified by responsible managers or field service engineers. Other combinations of reviews for establishing processes for achieving the maintenance scheduling tool are, of course, applicable.

Dynamic Maintenance Scheduling Tool Utilizing Influence Factors and Usage.

The first way for creating the dynamic part of the scheduling tool is to use influence factors and the usage. For this, the influence factors have to be identified. If no failure information is available, multiple linear regression analyses can not be performed. An alternative method is to base the identification and also a graduation of the influence factors on experience and knowledge among men skilled in the art. Multiple linear regression analyses are performed in order to identify and graduate different factors impact on lifetimes of the parts. Each factor's impact is expressed in terms of an m-value, which thus serves as a measure of the influence of the influence factor. These m-values can then be used for estimating the influence on a dependent value. The dependent value is normally the lifetime for a specific part. The m-values can be replaced with values generated from for example a workshop among men skilled in the art with experience and knowledge of the specific robot tool. During the workshop they can identify factors, that have impact on the lifetimes of the different parts and then graduate each factor with a measure of the factor's influence. The values will perform as substitutes for the m-values (the measure of the influence factor) from the multiple linear regression analysis.

When the replacement time intervals are estimated and the influence factors are identified and graduated, the dynamic maintenance scheduling tool can be created. Multiple linear regression is based on a linear relation between the influence factors and the lifetime for the part. The replacement time intervals are based on experience among men skilled in the art and can be an interval from, for example, hard to soft usage. The graduation of the influence factor can then be complemented with maximum and minimum set up values for each factor. For each set up, a percentage of the maximum set up can be calculated and then the total wear factor for each part can be calculated as percentage of the maximum possible set up.

The replacement time for parts that are hard used can represent the shortest time for replacement and together with the replacement time for soft used parts, a replacement time interval can be estimated. The time for replacement of a specific part will then be estimated by a linear relation between the influence factors and the replacement time. If the set up values are the maximum for an industrial robot, parts will be replaced after the times according to the estimation among the experienced men skilled in the art for hard used parts.

With times for replacements and the graduation of the influence factors available, the dynamic maintenance scheduling tool can be created. The replacement time intervals, stated by the men skilled in the art, can be integrated with the analysis of the influence factors from the workshop. Industrial robots that are used with maximum set values, the shortest replacement time will be shown in the schedule for the different parts. The replacement times can be defined with a linear relation to the set up values. An example is given below in the embodiments of the invention Dynamic Scheduling Tool by Cost and Usage The second way for creating the dynamic maintenance scheduling tool is to use the result from the multiple linear regression and the cost optimized maintenance analyses. When the critical parts are selected and the replacement times for the critical parts are stated the creation of the tool for dynamic maintenance scheduling needs to be created. The critical parts and the replacement times shall be shown in a schedule. The performed multiple linear regression analyses will define the influence factors and also result in distributions that can be used for stating the function probability. The tool can be created for making it possible to just fill out the set up values for a specific robot for establishing a dynamic maintenance schedule for the specific robot. When the set up values are filled out the tool will generate a schedule with replacement times that are based on the usage of the robot.

Schedule Updating

Three ways for updating the dynamic scheduling tool can be used. In a first way updating is performed by complementing with failure information. In a second way continuous update is performed by use of failure information. A third way uses a system for automatic updating. The first two ways can be used as the final step in processes tool Complementing with Failure Information When the dynamic maintenance scheduling tool is created without failure information it has to be updated continuously in order to keep it up to date. If failure information and failure statistics becomes available, the process needs to be performed as in the process with complete failure information in order to create schedules that are also based on statistical methods.

Continuous Updates with Failure Information

Dynamic maintenance scheduling tools based on statistical methods needs to be updated frequently in order to keep them up to date. Changes can for example be design changes on the industrial robot or exchange rate changes which might affect cost optimized maintenance analyses.

A System for Automatic Updates of the Maintenance Scheduling Tool.

Both of the above listed ways for updating the dynamic maintenance scheduling tool require several work hours. It is possible to utilize a system with permanent improvements by use of the different methods in this report. In a system for automatic updates all robots included in the system are connected to the system. When a failure occurs the field service engineer has to report complete failure information to the system. All failures that are reported to the system will be stored in a database. The selection of the critical parts is performed by frequent Weibull analyses. Parts with failure rates that motivate preventive replacements are selected. Multiple linear regression analyses can then be performed continuously for generating updated function probabilities for the selected critical part. The replacement times in the original scheduling tool will then be updated with the latest replacement times that will be based on the result from the cost optimized maintenance analyses. The cost optimized maintenance analyses are based on the function probabilities from the continuously performed multiple linear regression analyses. The schedules will then always be based on the latest replacements. The more failures that are reported to the database, the more accurate and reliable the maintenance schedules will be.

DESCRIPTION OF EMBODIMENTS

Below the invention will be explained in greater detail by description of embodiments with reference to the accompanying drawings.

The dynamic scheduling of the maintenance time of a machinery part will, in the following, be dedicated to a part of an industrial robot only and to an industrial robot as whole by compilation of maintenance times of individual parts of the individual robot, but the methods according to the aspects of the invention can as well be used for an arbitrary part of a machinery, wherein the conditions and methodology of the present invention are applicable.

Selection of Critical Parts

The first way of selecting critical parts uses experience and knowledge among med skilled in the technical field of industrial robots and having knowledge of the specific tool of the robot for the selection of the critical parts to be analysed with respect to maintenance scheduling. These men skilled in the art know the parts, that usually break down on industrial robots and also which parts, that can be replaced in order to increase the function probability of the robot. Said experience and knowledge can be collected as statistical data for the respective part.

A second way of selecting the critical parts uses study of spare parts sale lists. The spare parts sales lists can perform as an indicator of critical parts of the specific robot tool. By deleting parts, that obviously not have failure rates motivating preventive replacements, from the list, will reduce the number of parts on the list. Such parts, that could be removed from the list, could be packings, sealings, stickers, washers and electrical components etc. When these parts have been removed from the list, the number of the remaining parts can be used as a selection of the critical parts. The spare parts sale lists must contain all sold spare parts for the specific robot tool. The use of information based on spare parts sale lists requires data of sold spare parts (warranty cases taken into consideration), knowledge of the specific robot tool and knowledge of failure types of different parts.

Figure 1:
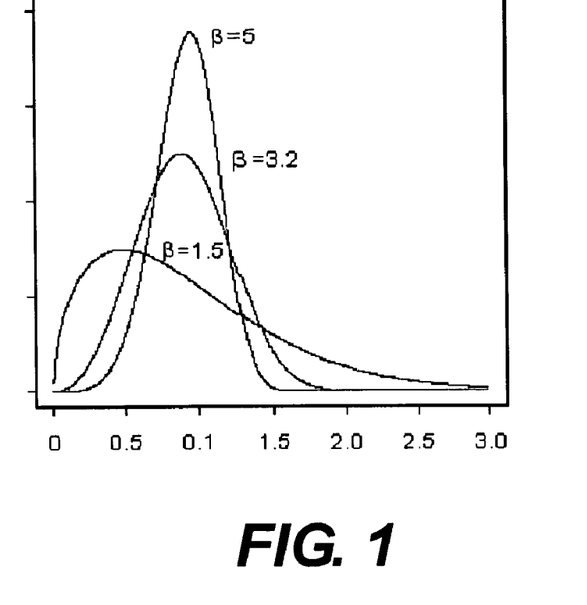
FIG. 1 shows curves illustrating failure distributions of parts.

A third way of selecting critical parts uses a "Weibull Analysis of failure data". By studying a failure rate and failure distribution of each critical part of the industrial robot, it is possible to evaluate whether the part has a failure rate which motivates preventive replacements. Parts in the scheduling tool must have failure rates that increase with time. Weibull analyses require a population of similar parts but also information about the operating times of parts in the population before a failure occurs. This third way will result in a failure distribution and a function probability for each part. A shape parameter $\beta$ is used for expressing the distribution of lifetimes for a population of similar parts. The value of the shape parameter gives information of the variance of the failures. Wear out failures have $\beta$-values greater than 1. This means that the failure rate increases with time. If $\beta$-values greater then one are achieved, the failure rate motivates preventive replacements. Parts with $\beta$-values greater then one have function probabilities that will be increased by preventive replacements. Examples of such failure distributions are illustrated in FIG. 1. The horizontal axis indicates unit of time.

A use of the result from a Weibull analysis for selecting the critical parts is the most reliable way, because it is based on statistics of occurred failures. Thus, to perform a Weibull analysis failure, statistics from a population with similar parts is required. Preferably, the analysis is executed on software calculating according to the Weibull function.

Estimation of Replacement Times

The first way for the estimation of replacement times for the selected critical parts is to use multiple linear regression and cost optimized maintenance. Multiple linear regression is used for stating each part's function probability and the cost optimized maintenance is used for estimating the optimal time for replacing each part. The method requires failure times and failure information for each part and also the cost for preventive and corrective replacements. The function probability is stated by using the distribution from the multiple linear regression analysis. The function probability can then be used for estimating the optimal time for replacement with the cost optimized maintenance method.

Multiple linear regression is a tool that can be used to find relations between several factors and a dependent value. Multiple linear regression can therefore be used to find the relation between factors having influence on the lifetime and the lifetime for a technical system. In order to explain multiple linear regression, a practical example is illustrated. The purpose with the example is only to explain the possibilities of multiple linear regression and therefore only fictive values are used.

Example of Multiple Linear Regression

Lifetimes for similar parts in a technical system varies a lot. The technical system is always used for one specific operation but the factors having influence can be different. Factors that have influence on the lifetime and that can change are here: program speed, tool weight and acceleration. The temperature can not be changed but is still considered as a contributing factor. Failure information for ten similar failed parts is documented in an example (table 1) below illustrated by means of figures related to the influence factors $X_1$ to $X_4$.

TABLE 1

Overview of failure information used in the example of multiple linear regression. Failure information and influence factors for each failed part is also shown.

| Part | $X_1$ | $X_2$ | $X_3$ | $X_4$ | Y |
|---|---|---|---|---|---|
| Part A | 60 | 5.5 | 32 | 22 | 320 |
| Part B | 42 | 4.2 | 21 | 19 | 460 |
| Part C | 21 | 1.5 | 12 | 21 | 600 |
| Part D | 40 | 4 | 19 | 18 | 470 |
| Part E | 46 | 3.8 | 24 | 21 | 435 |
| Part F | 32 | 3 | 15 | 17 | 548 |
| Part G | 17 | 2 | 5 | 23 | 680 |
| Part H | 54 | 4 | 27 | 20 | 374 |
| Part I | 35 | 5 | 19 | 24 | 535 |
| Part J | 50 | 5 | 25 | 20 | 398 |

Figure 2:
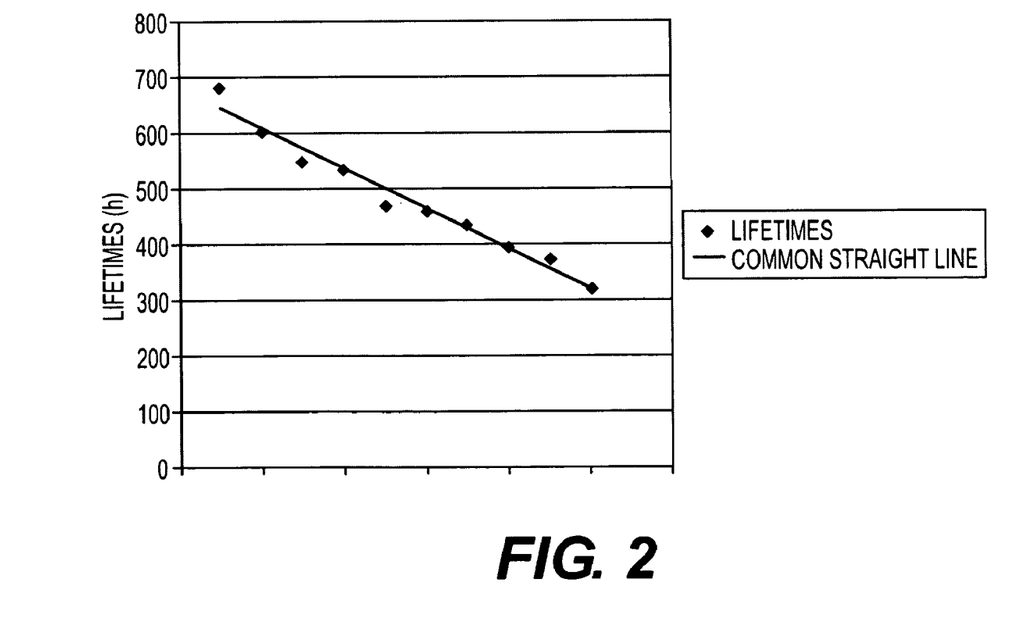
FIG. 2 is shown to explain the aim with multiple linear regression.

The lifetimes for the ten different parts in the example are pointed out in FIG. 2. Multiple linear regress ion minimizes the least squares in order to state an equation for the common straight line.

$$Y=m*x+b$$

The Y-value is the dependent value and in the example the Y-value is the lifetime. The x-value is the value of the influence factor and the coefficient m is the factor's influence on the dependent value.

$$Y=m_1*x_1+m_2*x_2+m_3*x_3+m_4*x_4+b$$

Utilizing software for performing the linear regression the result for the different lifetimes and set ups can be presented in a table as shown in table 2.

TABLE 2

Explanation of the multiple linear regression function by use of, in this example, the Microsoft Excel software.

| $x_4$ | $x_3$ | $x_2$ | $x_1$ | Constant |
|---|---|---|---|---|
| $m_4$ | $m_3$ | $m_2$ | $m_1$ | B |
| $sa_4$ | $sa_3$ | $sa_2$ | $sa_1$ | $sa_b$ |
| R | $sa_y$ | | | |
| F | df | | | |

$m_n$ = Coefficients for the x-values
B = Constant
$sa_n$ = Standard deviation for the factors.
$sa_b$ = Standard deviation for the constant.
R = Reliability of analyze.
$sa_y$ = Standard deviation for the dependent value.
F = F-observed. Used for evaluating the reliability of analyze.
df = Degrees of freedom. Used when comparing the F-observed and F-critical values.

The ten lifetimes and the set up information were analyzed. The result from the example gave the following result.

TABLE 3

Result sheet from the multiple linear regression performed in Microsoft Excel. Each value can then be used for further analyses.

| $x_4$ | $x_3$ | $x_2$ | $x_1$ | Constant |
|---|---|---|---|---|
| 2.938 | −6.433 | 6.427 | −4.734 | 713.306 |
| 1.902 | 2.692 | 5.474 | 1.613 | 43.230 |
| 0.995 | 10.804 | | | |
| 230.244 | 5 | | | |

For estimating the reliability of the result, three methods can be used. The first method is to look at the R-value in the result table. The R-value for the example is 0.995 which means that the reliability of the analysis is 99.5%.

The second method for controlling the reliability of the result is to use the value for F-observed and compare it with the value for F-critical, which can be found in special tables.

The third method for controlling the reliability is to check the reliability of each influence factor. This can be done by using the t-observed value and the t-critical value. Each factor's t-observed value can be calculated with the following formula.

$$t\text{-observed} = \frac{|m_n|}{sa_n}$$

The t-critical value can be found in special tables. Each factor's t-observed value can then be compared with the t-critical value. In table 4, each influence factor's ($x_1$ to $x_4$) t-observed value is compared with the t-critical.

TABLE 4

Overview of the different influence factors from the example of multiple linear regression. The deviation are used to determine if the factor is influencing on the lifetime.

|  | $x_1$ | $x_2$ | $x_3$ | $x_4$ |
| --- | --- | --- | --- | --- |
| $m_n$ | −4.734 | 6.427 | −6.433 | 2.938 |
| $sa_n$ | 1.6128 | 5.474 | 2.692 | 1.902 |
| t-observed | 2.935 | 1.174 | 2.389 | 1.545 |
| t-critical | 2.57 | 2.57 | 2.57 | 2.57 |
| Deviation | 0.365 | −1.396 | −0.181 | −1.025 |

If the deviation of t-observed and t-critical is positive, the factor is influencing on the dependent value. Program speed is the factor that influences the most on the lifetime. After controlling the reliability of the result, the factors can be used for predicting lifetimes for similar parts.

For illustrating the prediction, a similar part as in the example is used. The part is called part P and the set up for it is shown in table 5.

TABLE 5

Overview of the set up for a part used in the example of multiple linear regression. The set up values can then be used for predicting the lifetime for the part.

| $X_1$ | $X_2$ | $X_3$ | $X_4$ | Lifetime |
| --- | --- | --- | --- | --- |
| 36 | 3 | 17 | 22 | ? |

For predicting the lifetime the set up values from table 5 and the m-values from table 4 are used in the formula:

Lifetime Part $P$=36*−4.734+3*6.427+17*−6.433+ 22*2.938+713.306=517438 $h$

The predicted lifetime is 517438 h. In order to get a more accurate and more reliable predicted lifetime, the multiple linear regression analysis should be based on a larger amount of failed parts. Another method is to reduce the m-values by subtracting the standard deviations from the m-values. The predicted lifetime will then be shorter but the possibility for the part to reach the predicted lifetimes will increase.

Using Multiple Linear Regression for Stating the Function Probability.

Multiple linear regression can also be used for stating the function probability for a specific part. The m-values from the analysis can be used for calculating the lifetime (the dependent value) for other similar parts by using the set up values in the equation for the common straight line.

Before creating the distribution, the m-values influences on the dependent value have to be analyzed. M-values that do not influence the dependent value should not be used for stating the function probability. The different m-values are normal distributed and have standard deviations. The influence factors are independent and each factor's distribution and standard deviation can be stated. The first factor "$m_1 * x_1$" contains an m-value and a set up value. Assume that "m" is distributed according to:

$$m_1 \rightarrow N(\overline{m}_1, \sigma_1)$$

The expected value for the first factor is then:

$$E(m_1 x_1) = x_1 * \overline{m}_1$$

And the standard deviation for the first factor is $$D(m_1 x_1) = |x_1| * \sigma_1$$

The distributions, expected values and the standard deviation for the other factors are stated with the same procedure and presented in the following text boxes.

$$m_2 \rightarrow N(\overline{m_2}, \sigma_2)$$
$$E(m_2 x_2) = x_2 * \overline{m_2}$$
$$D(m_2 x_2) = |x_2| * \sigma_2$$

$$m_3 \rightarrow N(\overline{m_3}, \sigma_3)$$
$$E(m_3 x_3) = x_3 * \overline{m_3}$$
$$D(m_3 x_3) = |x_3| * \sigma_3$$

$$m_4 \rightarrow N(\overline{m_4}, \sigma_4)$$
$$E(m_4 x_4) = x_4 * \overline{m_4}$$
$$D(m_4 x_4) = |x_4| * \sigma_4$$

The distribution, the expected value and the standard deviation for the constant "b" is presented in the following text box.

$$b \rightarrow N(\overline{b}, \sigma_b)$$
$$E(b) = \overline{b}$$
$$D(b) = \sigma_b$$

The expected value for the dependent value "Y" can be stated with the formula:

$$Y \rightarrow N(E(Y), D(Y))$$
$$E(Y) = m_1 * x_1 + m_2 * x_2 + m_3 * x_3 + m_4 * x_4 + b$$
$$D(Y) = \sqrt{(x_1 \sigma_1)^2 + (x_2 \sigma_2)^2 + (x_3 \sigma_2)^2 + (x_4 \sigma_4)^2 + (\sigma_b)^2}$$

The distribution for the dependent value "Y" can then be used for stating the function probability for the specific part. The distribution is dependent of the set up values for the specific part. The function probability for the part can then be used for estimating the optimal time for replacing the part with the cost optimized maintenance method. The main advantages with using multiple linear regression for stating the function probability is that no categorizing for different usages such as hard, nominal and soft is required. The replacement time is based on the specific usage of the specific part.

When should Parts be Replaced?

There are several different methods for estimating times for when parts shall be replaced. Some of the methods are presented in the following text.

Accepted Function Probability

Figure 3:
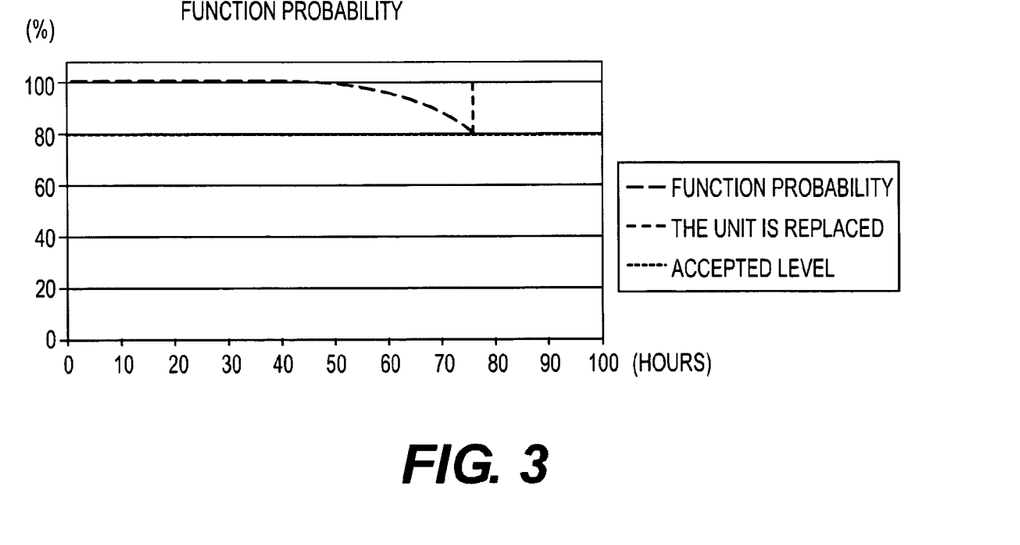
FIG. 3 is an illustration of the method to replace parts at an accepted function probability level.

This method is based on stating an accepted function probability and when the function probability has decreased to an accepted level the part will be replaced. With an accepted function probability level of 80% Part B in the comparison example should be replaced after 80 hours. This is illustrated in FIG. 3 as an illustration of the method to replace parts at an accepted function probability level. The part is replaced when the function probability has decreased to the accepted level.

Replace Before Time for Uphill

Figure 4:
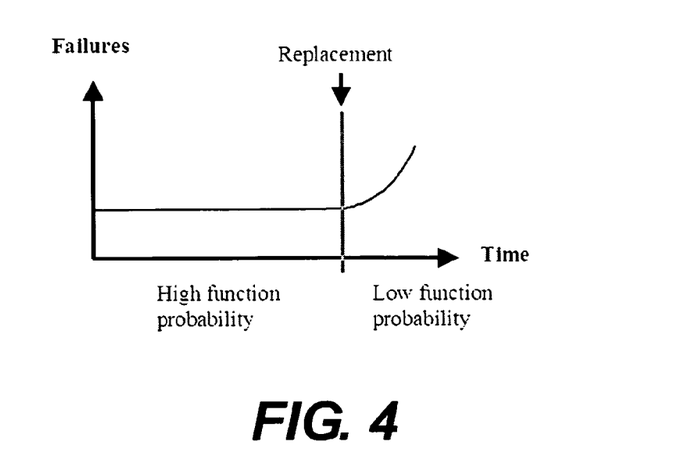
FIG. 4 illustrates a method to replace parts before the curve turns uphill in a failure rate figure.

Another method for estimating the time for when to replace parts is to analyze failure distributions. For parts with failure type wear out failure, it is possible to replace the part right before the failure rate increases (the function probability decreases). This is illustrated in FIG. 4 as a method to replace parts before the curve turns uphill in the failure rate figure. This is only to recommend for wear out failures.

To replace parts before the uphill curve in the failure rate is not always that easy because there may not be a clear uphill section in the curve. This method is very similar to the accepted function probability level and requires failure information.

Cost Optimized Maintenance

The third method for estimating the replacement times for parts is to use cost optimized maintenance. This method is based on estimating an optimal time for replacing parts. The method can only be used for parts with failure rates increasing with time and the costs for corrective replacements must be significantly higher than for the costs for preventive replacements. Preventive replacements are only motivated if the cost for a preventive replacement is lower then the cost for a corrective replacement.

An object of this method is to estimate the optimal time for replacing parts or the time for performing preventive maintenance activities. The optimal time for replacements can be illustrated with FIG. 5.

Figure 5:
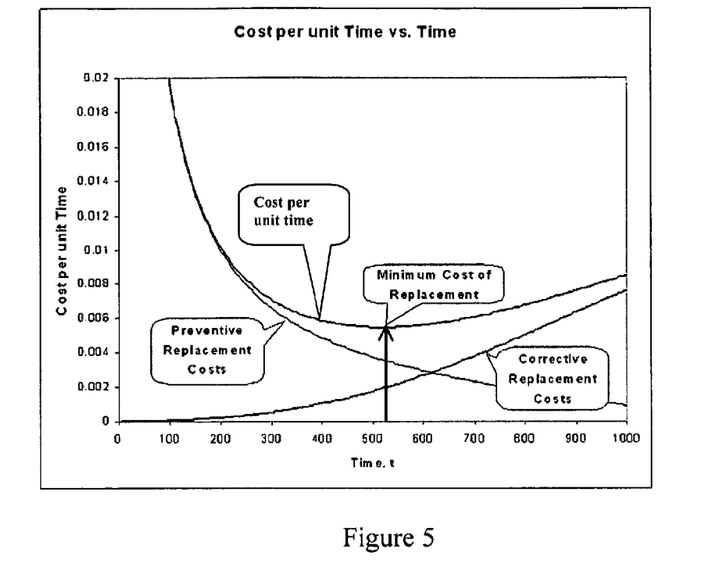
FIG. 5 is an illustration of the optimal time for replacement of a part.

The FIG. (5) illustrates the optimal time for replacing a specific part. The optimal time is based on the optimal balance between the costs for preventive replacements and the costs for corrective replacements. If preventive replacements are performed too often the cost will be high but the function probability will remain high. If preventive replacements are performed too seldom the cost for corrective replacements will be higher because the failure probability will increase and most likely more failures will occur.

The method requires the function probability function for the part and the cost for preventive and corrective replacements. The cost for preventive and corrective replacements does not have to be expressed in any specific currency because only the relation between them is required. The relation can for example be expressed in time. With the three parameters known, the optimal time for replacing the part can be estimated by first calculating the cost per unit time.

The optimal time for replacement is based on the assumption that by the time a failure occurs, a corrective action will occur and if a failure does not occur, a preventive action will occur. In order to estimate the optimal time for replacement the cost per unit time has to be calculated. The cost per unit time is calculated with the following formula.

$$CPUT(t) = \frac{\text{Total Expected Replacement Cost per Cycle}}{\text{Expected Cycle Length}}$$

$$= \frac{C_P \cdot R(t) + C_U \cdot [1 - R(t)]}{\int_0^t R(s) ds}$$

$CPUT(t)$=Cost per unit time.
$R(t)$=Function probability
$C_P$=Cost for preventive (planned) replacement.
$C_U$=Cost for corrective (unplanned) replacement.

Cost per unit time is used for estimating the cost for replacing parts at different intervals. The optimal time for the replacement can be estimated by solving for the value of "t" that satisfies the following equation.

$$\min_t CPUT(t) = \frac{\partial \left[ \frac{C_P \cdot R(t) + C_U \cdot [1 - R(t)]}{\int_0^t R(s) ds} \right]}{\partial t} = 0$$

At the optimal replacement time the cost for replacing the part will be minimized. The optimal time is when the CPUT is minimized.

Experience and Knowledge for Estimating Replacement Times

A second way for estimating the replacement times for the selected critical parts is to let people with experience and knowledge in industrial robots (or for the specific type of machinery analysed) state the replacement times. Men skilled in the art working with service and maintenance on industrial robots have the experience and knowledge to be able to state replacement times and lifetimes for the selected critical parts. These people know when the parts break down and also when the parts have to be replaced in order to prevent failures. By interviewing and letting these people fill out lifetime intervals and replacement times for different used critical parts, this second way can perform as a substitute for statistical methods. The aim for the activity is to determine approximate failure distributions that are estimated in the Weibull analyses. The information from the experienced men skilled in the art can be used for approximating lifetimes for the parts when they are used hard, nominal or soft. These lifetimes will then represent the failure distributions for parts used hard, nominal and soft. It is very complicated to approximate the shape of failure distributions without any failure statistics and therefore an assumption needs to be done.

The distribution of usages and failures for a specific part in a specific robot can be assumed to be distributed in several ways. Because, if no failure information is available, it is not possible to know if the failures are Weibull distributed, normal distributed or distributed with other shapes. The normal distribution is assumed for both usage and failures because it is a distribution that most readers might be familiar with.

In this description, two different versions for processing a dynamic maintenance scheduling tool are disclosed, a full process and a simplified process. In the full process version, a further step of a control of the quality of the predicted replacement times.

There are two reviewing methods for controlling the quality of the replacement times. Both of methods are based on letting people with experience and knowledge in industrial robots evaluate and verify the replacement times.

Quality Control Review with Hard, Nominal and Soft Schedules

Information about lifetimes and replacement times based on experience and knowledge among men skilled in the art is collected and should be controlled by other people. The lifetimes and the replacement times can be sent to responsible managers in order to get said times verified. If the responsible managers do not verify the lifetimes and the replacement times it is preferred that they write comments for required improvements.

Quality Control Review with Schedules for Different Usage Scenarios

Even if a complete failure information has been used for estimating the times for replacement of the parts, said times should be validated and verified by responsible managers or field service engineers. They are responsible for the product, (the machinery, the industrial robot) and also responsible for replacements on robots. Sending out an overview of the critical parts and the replacement times for each part and let them validate the overview or decline it with comments can perform as a quality control. If the overview is accepted and verified, the work can continue but if the overview is declined, the previous work has to be re-performed until the overview is verified.

The creation of the dynamic scheduling tool is generally described above in the summary of the invention by use of influence factors and usage.

EXAMPLE

Part Y is used in Robot Y. The program speed for the Robot is 1250 mm/s. It uses 60% of the envelope and the tool weight is 10 kg. The time for the replacement can then be estimated. The identification and graduation of the influence factors from a workshop is presented in the table. The approximated replacement time interval is from 20000 h for hard used parts to 40000 h for soft used parts.

| Part | Program speed | Envelope usage | Tool weight |
|---|---|---|---|
| Part Y | 4 | 3 | 1 |

0 = No influence on Part Y's lifetime
5 = Big influence on Part Y's lifetime

Maximum and minimum set up values for the three factors.

| Program speed (PS) | Envelope usage (EU) | Tool weight (TW) |
|---|---|---|
| 0 = 0 mm/s ↓ 5 = 3000 mm/s | 0 = 0% ↓ 5 = 100% | 0 = 0 kg ↓ 5 = 16 kg |

Estimation of the total wear factor for Part Y
Wear rate=Influence factor *% of max set up $$\text{Wear rate } PS = 4*(1250/3000) = 1,667$$

$$\text{Wear rate } EU = 3*(60/100) = 1,8$$

$$\text{Wear rate } TW = 1*(10/16) = 0,625$$

$$\text{Sum} = 8 = 4,092$$

Figure 6:
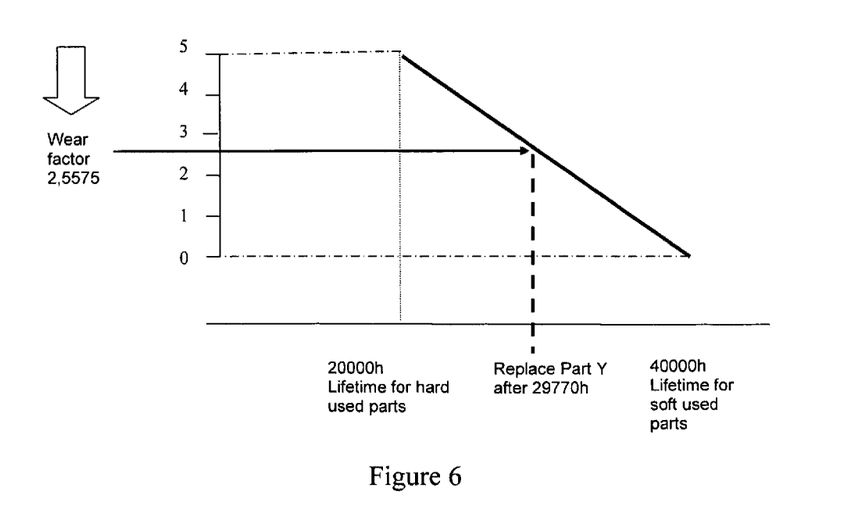
FIG. 6 is illustration of scheduled time for replacement time of part Y according to an example.

The totally achieved wear factor for Part Y is: (4.092/8)*5=2.5575. The example is illustrated in FIG. 6.

Processes for Dynamic Maintenance Scheduling Tools for Industrial Robots

Two processes have been developed, a so called Full process and a so called Simplified process. The Full process is developed for generating dynamic maintenance scheduling tools by using complete failure statistics and failure information and also experience and knowledge among men skilled in the are. The Simplified process is developed for making it possible to create dynamic maintenance scheduling tools without failure statistics and failure information.

Full Process

Figure 7:
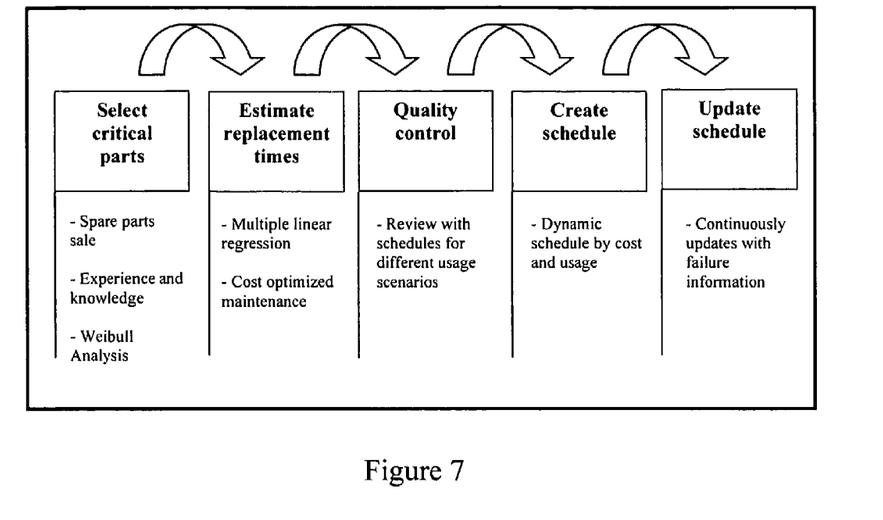
FIG. 7 is an illustration of a full process update.

The Full process is based on spare parts sale, failure statistics, failure information and information from men skilled in the art with experience and knowledge in maintenance and service on industrial robots. The Full process contains four main steps and also a fifth step with updates. The updates have to be performed continuously in order to keep the schedule up to date. The Full process is illustrated in FIG. 7.

The first step in the Full process is to select critical parts that will be represented in the schedule. For an accurate and reliable selection of the critical parts all three of the ways to select critical parts are used.

The second step in the Full process is to estimate the replacement times for the critical parts. This is performed with multiple linear regression and cost optimized maintenance analyses.

When the critical parts are selected and the times for replacements are stated, the schedule needs to be verified as discussed previously. The forth step in the Full process is to create the dynamic maintenance scheduling tool. A tool is created, that enables the users to fill out set up values for their robot individual, whereby the scheduling tool then generates maintenance schedules based on the usage of the robot individual and the costs for the replacement taken into account. Said set up values comprises parameters related to the usage, including relevant parameters representing factors influencing the lifetime of said specific parts and are utilized as input data to said dynamic maintenance scheduling tool for said specific part(s) of the machinery, whereupon a dynamic maintenance schedule for said specific part or parts of said specific machinery is achieved as output data from said tool.

The fifth step in the Full process shall be continuous and performed as long as the industrial robot tool is in use. The dynamic maintenance scheduling tool needs to be updated and adjusted in order to be accurate and reliable. If parts in the industrial robot are exchanged, multiple linear regression analyses must be performed for stating new replacement times for the part. Failure documenting and updating of cost optimized maintenance if, for example, the rate of exchange of a part changes are also updating activities. All failures that occur must be documented and used in new multiple linear regression analyses.

Simplified Process

Figure 8:
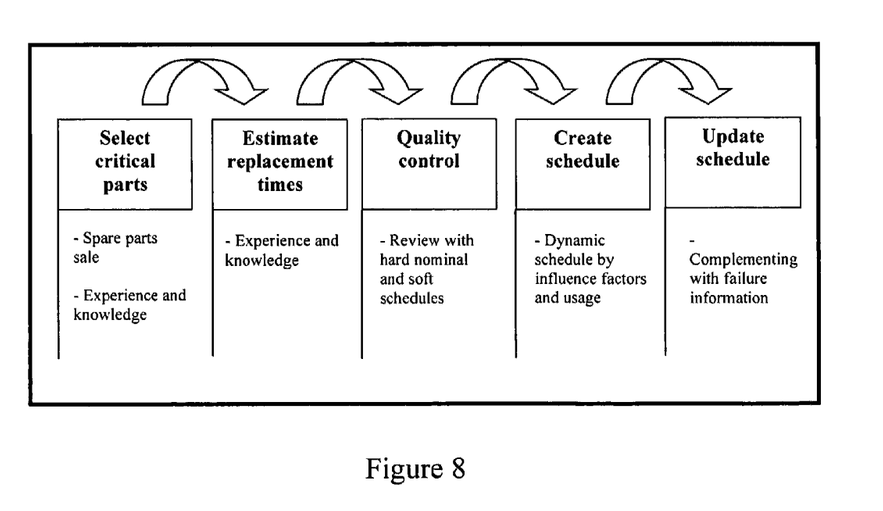
FIG. 8 illustrates the steps in a simplified process update.
Figure 9:
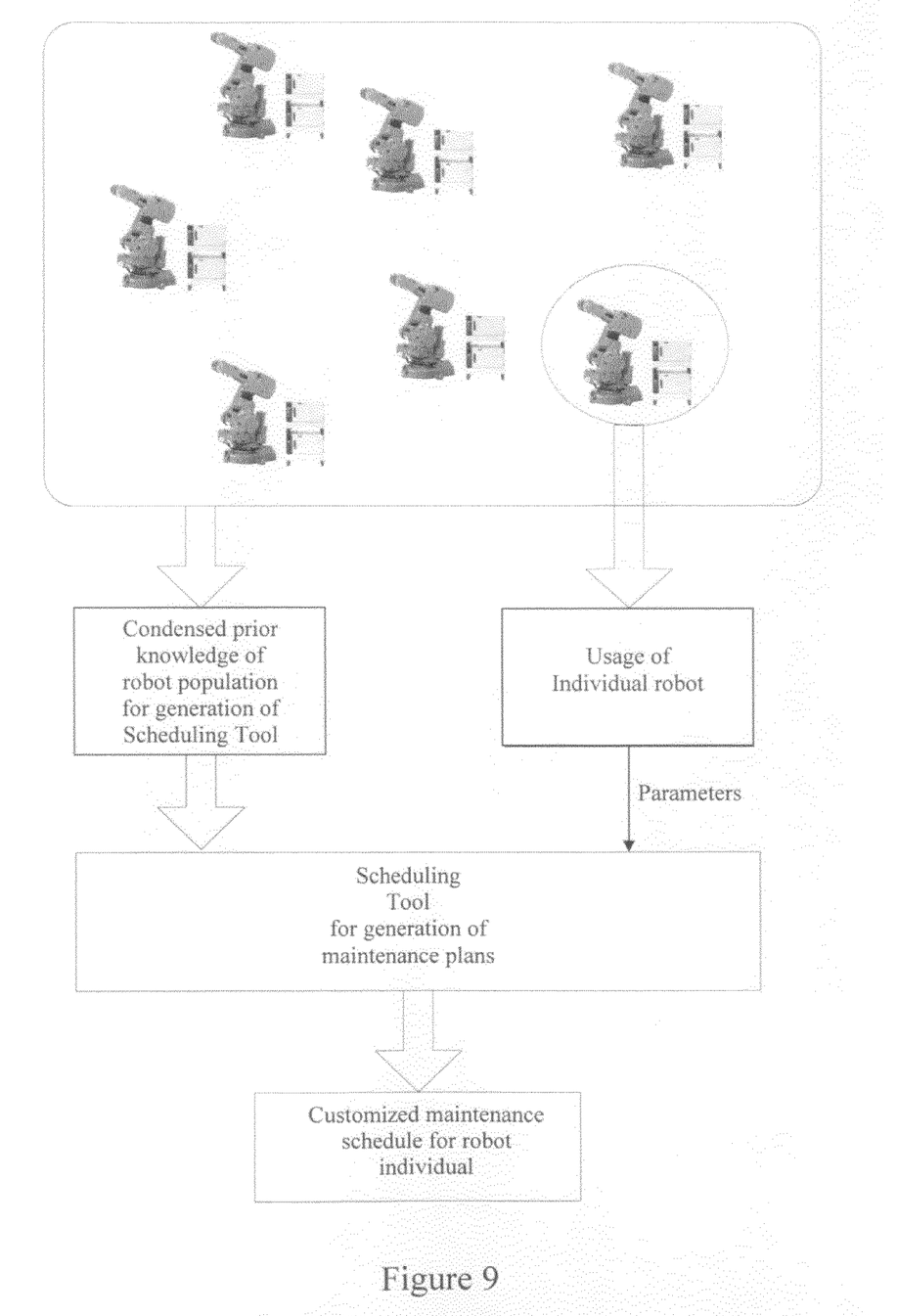
FIG. 9 shows a world map indicating that statistical data from wide spread industrial robots are collected and analyzed according to the invention for forming the scheduling tool for dynamic maintenance and that a robot individual can use said tool for a customized maintenance schedule dedicated said robot individual.

The Simplified process is developed for users without failure statistics and failure information. The process is based on experience, knowledge and spare parts sale. There are four main steps and also a fifth step with updates. The activities used in each step are illustrated in FIG. 8.

The first step in the Simplified process is to select critical parts according to the first two ways previously stated. The first way is an analysis based on experience and knowledge among men skilled in the art. The second way is based on a study of the list of spare parts sale for the specific robot tool.

The second step in the Simplified process is to estimate replacement times for the selected critical parts. The estimation of the replacement times are based on experience and knowledge among men skilled in the art of industrial robots as discussed above.

The third step in the simplified process is to get the replacement times verified. A review group of responsible managers are appointed. A review document with a short description of the review activity is prepared and attached to the maintenance schedules for parts used hard, nominal and soft. The task for the review group is to determine whether the replacement times are correct or not. They can either verify or decline the schedules.

The fourth step in the simplified process is to create the dynamic maintenance scheduling tool. The dynamic maintenance scheduling tool will be based on influence factors and usage. A workshop with men skilled in the art with experience and knowledge of factors that impact on lifetimes of parts is set up. In the workshop an estimation and graduation of the influence factors are performed. By use of the graduation of the influence factors together with the replacement time intervals for each part said scheduling tool is created. Said scheduling tool enables the users to fill out set up values for their robot individual in the same way as with the Full process for the maintenance scheduling tool and will thus generate a maintenance schedule with recommended replacements for each part based on the usage of the robot.

When the dynamic maintenance scheduling tool is created, in a fifth step, it requires continuously updates. Failure information has to be documented. When failure information gets available the replacement times and the influence factors can be controlled with statistical tools. The selection of the critical parts, the replacement times and the influence factors can be controlled with Weibull and multiple linear regression analyses. If the documented failure information is complete the full process should be performed for creating more reliable maintenance schedules.

The Full process and the Simplified process have to be performed and updated manually. The two processes could be complemented with a system that updates the scheduling tools automatically or creates new schedules right away. The schedules can then be used until failures are reported into the system. When failures occur, the failure time, set up information and usage information are reported to a database included in the tool. A new multiple linear regression analysis is performed and if it generates a new function probability for the part, a new cost optimized maintenance analysis will be performed. When all procedures are performed the dynamic maintenance scheduling tools are updated. The more failures that are reported to the database, the more accurate and reliable the scheduling tools will be.

When a maintenance schedule for a part of an industrial robot, for a robot individual or an industrial robot population is established said schedule should then be updated, regularly, according to a proper scheme by means of inputting into said maintenance scheduling tool the set values and the usage of the robot in order to acquire a maintenance schedule based upon most recent data for processing said maintenance scheduling tool. This action is of course most important as soon as the conditions for the use of the robot changes, for example depending on a new and different use of the robot, or changed environment for the robot, etc.

The processes for establishing said dynamic maintenance scheduling tool is implemented as a computer program product, wherein the algorithms as specified herein are programmed and listed as computer readable code. As previously mentioned, data regarding the usage of robots and all data associated with the robots, as well as information necessary for performing the processing of the tool, such as results and statistics regarding the robot and robot part is stored in a database accessible by the program processing said tool.

The invention claimed is:

1. A method in a maintenance scheduling tool implemented in a computer system for generating a dynamic maintenance schedule for a part of a machinery, the method comprising:
   selecting a critical part of the machinery,
   identifying influence factors having influence on a lifetime of said selected part,
   estimating replacement time for said selected part, and
   creating said maintenance schedule for said part of the machinery based on said identification of the influence factors and said estimated replacement time,
   wherein said estimating replacement time for said selected part comprises:
   performing a multiple linear regression based on data for failure times, failure information and costs for preventive replacement of said selected part for stating said part's function probability and using said function probability for estimating an optimal time for replacing the part, and
   performing, using a computer, an estimation of replacement time of the part based on collected information of the lifetime intervals and replacement times for said part.

2. The method according to claim 1, further comprising:
   evaluating a quality of said estimation of replacement time for said selected part based on verified collected information on prior knowledge about replacement times for said selected part.

3. The method according to claim 1, wherein said selecting a critical part comprises at least one of:
   an analysis of statistical data based on collected information of parts that usually break down and parts that are replaced to increase a function possibility,
   an analysis based on spare part sale, and
   a Weibull analysis performed on failure data of critical parts of the machinery.

4. The method according to claim 1, wherein said identifying influence factors comprises at least one of:
   performing a multiple linear regression analysis on lifetimes and different factors impact on the lifetimes of said machinery part resulting in said identification of the influence factors for the part and a graduation of the impact of said identified influence factors, and
   performing a graduation of said influence factors impact on the lifetime of said selected critical part based on statistical information extracted from experience and knowledge among men skilled in the art if no failure information is available for said selected critical part.

5. The method according to claim 2, wherein said evaluating the quality of said estimation of replacement time for said selected part comprises at least one of:
   reviewing lifetime and replacement time according to collected information of the lifetime intervals and replacement times for said selected part, and
   reviewing complete failure information, with respect to the specific critical part and performing a validation and verification of estimated replacement times by use of statistical data related to said critical part collected from responsible managers or field service engineers.

6. The method according to claim 1, wherein a process of establishing a full dynamic cost optimized maintenance scheduling tool for said part of the machinery comprises:
   selecting a critical part,
   performing a multiple linear regression based on data for failure times, failure information and costs for preventive replacement of said selected part for stating a function probability of the part and a cost analysis estimating the optimal time for replacing the part,
performing a review with schedules for the usage of the part, and
creating a tool enabling a user to fill out set up values as a percentage of the maximum values of the influence factors for said specific part for a robot and generating a maintenance schedule for said specific part based on the usage of the robot and the costs for the replacement taken into account.

7. The method according to claim 6, wherein said generation of a full dynamic maintenance scheduling tool further comprises:
updating replacement time, influence factors and cost optimized maintenance based on recent recorded failure information for the part.

8. The method according to claim 3, wherein generation of a simplified dynamic maintenance scheduling tool comprises:
selecting a critical part,
estimating the replacement time for the part based on experience and knowledge among men skilled in the art of industrial robots, and
generating a dynamic scheduling tool based on factors influencing the lifetime of the part and on the usage of the part.

9. The method according to claim 8, wherein said generation of a simplified dynamic maintenance scheduling tool further comprises:
updating replacement time and influence factors based on recent recorded failure information for the part.

10. The method according to claim 1, wherein said maintenance scheduling tool implemented in said computer system generates said dynamic maintenance schedule for a specific part of a specific machinery, further comprising:
inputting data into said dynamic maintenance scheduling tool, wherein said data are parameters related to the usage, including relevant parameters representing factors influencing the lifetime of said specific part, and
outputting from said dynamic maintenance scheduling tool a dynamic maintenance schedule for said specific part of said specific part of the machinery.

11. The method for establishing a dynamic maintenance schedule for a specific machinery individual according to claim 10, further comprising:
identifying the specific parts relevant for said maintenance schedule,
performing said dynamic maintenance schedule for each said relevant part of the machinery, and
compiling the obtained dynamic maintenance schedule for each said relevant part into a complete dynamic maintenance schedule for the machinery individual.

12. The method for establishing a dynamic maintenance schedule for a population of specific machinery individuals according to claim 10, further comprising:
identifying the specific parts relevant for said maintenance schedule of said population of specific machinery individuals,
performing said dynamic maintenance schedule for each said relevant part of said population, and
compiling the obtained dynamic maintenance schedule for each said relevant part into a complete dynamic maintenance schedule for said population of specific machinery individuals.

13. A computer program product, comprising:
a non-transitory computer readable containing computer instructions stored thereon for causing a computer processor to perform a method in a maintenance schedule tool for generating a dynamic maintenance schedule for a part of a machinery, the method comprising
selecting a critical part of the machinery,
identifying influence factors having influence on a lifetime of said selected part,
estimating replacement time for said selected part, and
creating said maintenance schedule for said part of the machinery based on said identification of the influence factors and said estimated replacement time,
wherein said estimating replacement time for said selected part comprises:
performing a multiple linear regression based on data for failure times, failure information and costs for preventive replacement of said selected part for stating said part's function probability and using said function probability for estimating an optimal time for replacing the part, and
performing an estimation of replacement time of the part based on collected information of the lifetime intervals and replacement times for said part.

14. A dynamic maintenance scheduling tool, comprising:
the computer program product comprising:
a non-transitory computer readable containing computer instructions stored thereon for causing a computer processor to perform a method in a maintenance schedule tool for generating a dynamic maintenance schedule for a part of a machinery, the method comprising
selecting a critical part of the machinery,
identifying influence factors having influence on a lifetime of said selected part,
estimating replacement time for said selected part, and
creating said maintenance schedule for said part of the machinery based on said identification of the influence factors and said estimated replacement time,
wherein said estimating replacement time for said selected part comprises:
performing a multiple linear regression based on data for failure times, failure information and costs for preventive replacement of said selected part for stating said part's function probability and using said function probability for estimating an optimal time for replacing the part, and
performing an estimation of replacement time of the part based on collected information of the lifetime intervals and replacement times for said part, and
a database for storing data associated with the machineries, as well as information necessary for performing the processing of the tool, said database being accessible by the computer program processing said dynamic maintenance scheduling tool.

15. A system, comprising:
a computer program product comprising:
a non-transitory computer readable containing computer instructions stored thereon for causing a computer processor to perform a method in a maintenance schedule tool for generating a dynamic maintenance schedule for a part of a machinery, the method comprising
selecting a critical part of the machinery,
identifying influence factors having influence on a lifetime of said selected part,
estimating replacement time for said selected part, and creating said maintenance schedule for said part of the machinery based on said identification of the influence factors and said estimated replacement time,
wherein said estimating replacement time for said selected part comprises:
performing a multiple linear regression based on data for failure times, failure information and costs for preventive replacement of said selected part for stating said part's function probability and using said function probability for estimating an optimal time for replacing the part, and
performing an estimation of replacement time of the part based on collected information of the lifetime intervals and replacement times for said part;
a database for storing data associated with the machineries, as well as information necessary for performing the processing of the tool, said database being accessible by the computer program processing said dynamic maintenance scheduling tool; and
a computer for executing the computer instructions.

16. A method in a maintenance scheduling tool implemented in a computer system for generating a dynamic maintenance schedule for a part of a machinery, the method comprising:
selecting a critical part of the machinery,
identifying influence factors having influence on a lifetime of said selected part,
estimating replacement time for said selected part, and
creating said maintenance schedule for said part of the machinery based on said identification of the influence factors and said estimated replacement time,
wherein said identifying influence factors comprises:
performing a multiple linear regression analysis on lifetimes and different factors impact on the lifetimes of said machinery part resulting in said identification of the influence factors for the part and a graduation of the impact of said identified influence factors, and
performing, using a computer, a graduation of said influence factors impact on the lifetime of said selected critical part based on statistical information extracted from experience and knowledge among men skilled in the art if no failure information is available for said selected critical part.

17. A method in a maintenance scheduling tool implemented in a computer system for generating a dynamic maintenance schedule for a part of a machinery, the method comprising:
selecting a critical part of the machinery,
identifying influence factors having influence on a lifetime of said selected part,
estimating replacement time for said selected part,
creating said maintenance schedule for said part of the machinery based on said identification of the influence factors and said estimated replacement time, and
evaluating a quality of said estimation of replacement time for said selected part based on
verified collected information on prior knowledge about replacement times for said selected part,
wherein said evaluating the quality of said estimation of replacement time for said selected part comprises:
reviewing lifetime and replacement time according to collected information of the lifetime intervals and replacement times for said selected part, and
reviewing, using a computer, complete failure information, with respect to the specific critical part and performing a validation and verification of estimated replacement times by use of statistical data related to said critical part collected from responsible managers or field service engineers.

18. A method in a maintenance scheduling tool implemented in a computer system for generating a dynamic maintenance schedule for a part of a machinery, the method comprising:
selecting a critical part of the machinery,
identifying influence factors having influence on a lifetime of said selected part,
estimating replacement time for said selected part, and
creating said maintenance schedule for said part of the machinery based on said identification of the influence factors and said estimated replacement time,
wherein a process of establishing a full dynamic cost optimized maintenance scheduling tool for said part of the machinery comprises:
selecting a critical part,
performing a multiple linear regression based on data for failure times, failure information and costs for preventive replacement of said selected part for stating a function probability of the part and a cost analysis estimating the optimal time for replacing the part,
performing a review with schedules for the usage of the part, and
creating, using a computer, a tool enabling a user to fill out set up values as a percentage of the maximum values of the influence factors for said specific part for a robot and generating a maintenance schedule for said specific part based on the usage of the robot and the costs for the replacement taken into account.

19. The method according to claim 18, wherein said generation of a full dynamic maintenance scheduling tool further comprises:
updating replacement time, influence factors and cost optimized maintenance based on recent recorded failure information for the part.

20. A method in a maintenance scheduling tool implemented in a computer system for generating a dynamic maintenance schedule for a part of a machinery, the method comprising:
selecting a critical part of the machinery,
identifying influence factors having influence on a lifetime of said selected part,
estimating replacement time for said selected part, and
creating said maintenance schedule for said part of the machinery based on said identification of the influence factors and said estimated replacement time,
wherein said selecting a critical part comprises:
an analysis of statistical data based on collected information of parts that usually break down and parts that are replaced to increase a function possibility,
an analysis based on spare part sale, and
a Weibull analysis performed on failure data of critical parts of the machinery, and
wherein generation of a simplified dynamic maintenance scheduling tool comprises:
selecting a critical part,
estimating the replacement time for the part based on experience and knowledge among men skilled in the art of industrial robots, and
generating, using a computer, a dynamic scheduling tool based on factors influencing the lifetime of the part and on the usage of the part.

21. The method according to claim 20, wherein said generation of a simplified dynamic maintenance scheduling tool further comprises:

updating replacement time and influence factors based on recent recorded failure information for the part.

22. A method in a maintenance scheduling tool implemented in a computer system for generating a dynamic maintenance schedule for a part of a machinery, the method comprising:
selecting a critical part of the machinery,
identifying influence factors having influence on a lifetime of said selected part,
estimating replacement time for said selected part,
creating said maintenance schedule for said part of the machinery based on said identification of the influence factors and said estimated replacement time,
inputting data into said dynamic maintenance scheduling tool, wherein said data are parameters related to the usage, including relevant parameters representing factors influencing the lifetime of said specific part,
outputting from said dynamic maintenance scheduling tool a dynamic maintenance schedule for said specific part of said specific part of the machinery,
identifying the specific parts relevant for said maintenance schedule,
performing said dynamic maintenance schedule for each said relevant part of the machinery, and
compiling, using a computer, the obtained dynamic maintenance schedule for each said relevant part into a complete dynamic maintenance schedule for the machinery individual.

23. A method in a maintenance scheduling tool implemented in a computer system for generating a dynamic maintenance schedule for a part of a machinery, the method comprising:
selecting a critical part of the machinery,
identifying influence factors having influence on a lifetime of said selected part,
estimating replacement time for said selected part,
creating said maintenance schedule for said part of the machinery based on said identification of the influence factors and said estimated replacement time,
inputting data into said dynamic maintenance scheduling tool, wherein said data are parameters related to the usage, including relevant parameters representing factors influencing the lifetime of said specific part,
outputting from said dynamic maintenance scheduling tool a dynamic maintenance schedule for said specific part of said specific part of the machinery,
identifying the specific parts relevant for said maintenance schedule of a population of specific machinery individuals,
performing said dynamic maintenance schedule for each said relevant part of said population, and
compiling, using a computer, the obtained dynamic maintenance schedule for each said relevant part into a complete dynamic maintenance schedule for said population of specific machinery individuals.

* * * * *